(No Model.)
H. BRUNHAUS.
COFFEE URN.
No. 427,735. Patented May 13, 1890.
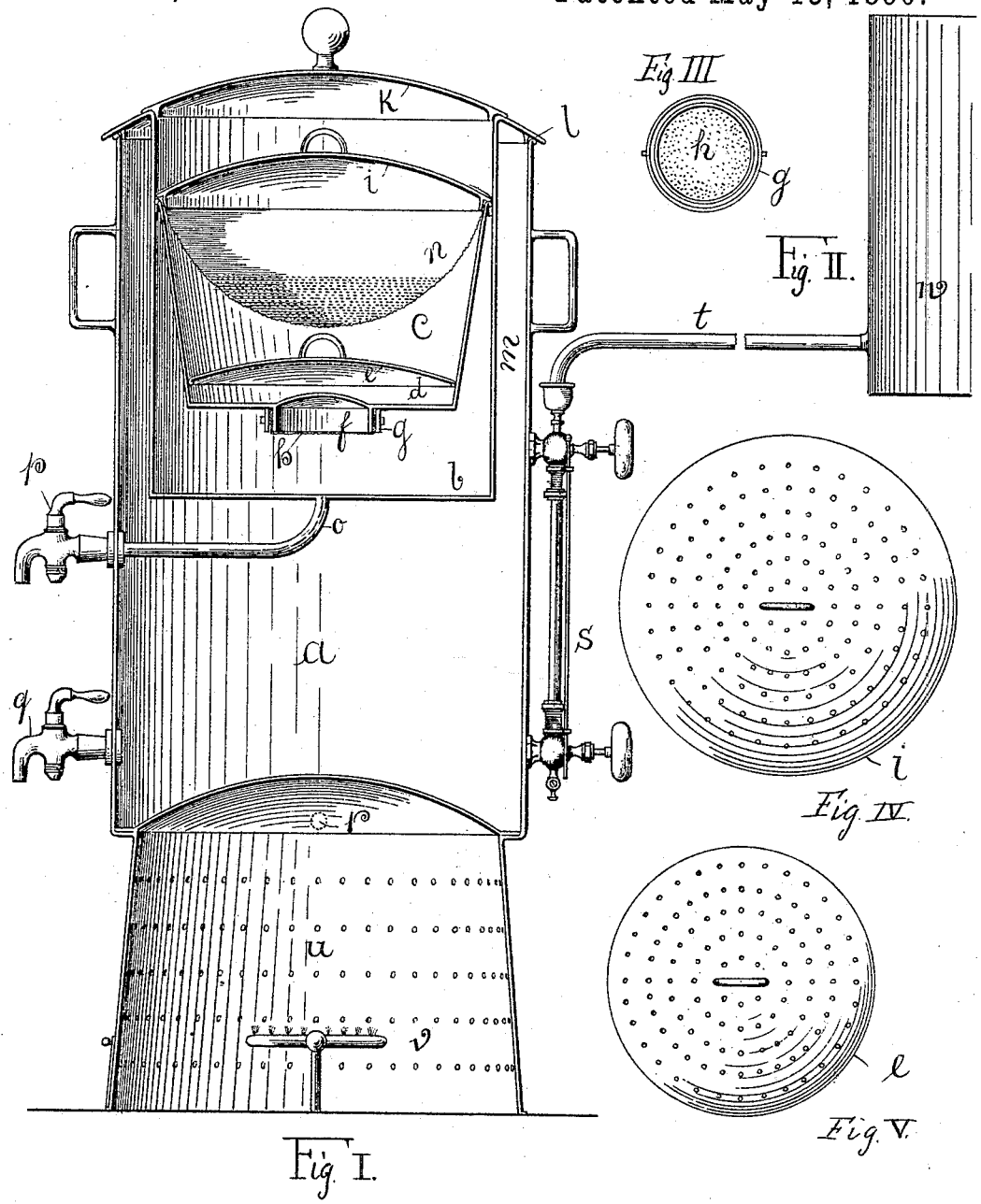
WITNESSES:
Chas V Scott
H. C. Caldwell
INVENTOR
Henry Brunhaus
BY G. L. Crammer
ATTORNEY

UNITED STATES PATENT OFFICE.

HENRY BRUNHAUS, OF WHEELING, WEST VIRGINIA.

COFFEE-URN.

SPECIFICATION forming part of Letters Patent No. 427,735, dated May 13, 1890.

Application filed September 30, 1889. Serial No. 325,541. (No model.)

*To all whom it may concern:*

Be it known that I, HENRY BRUNHAUS, a citizen of the United States, residing at Wheeling, in the county of Ohio and State of West Virginia, have invented a new and useful Coffee-Urn, of which the following is a specification.

My invention relates to improvements in an apparatus styled a "coffee-urn."

The object of my invention is to secure a thoroughly pure and clear coffee-liquid, to keep the same of a uniform heat for any length of time, and to extract fully all the qualities of the berry. I attain these objects by the mechanism illustrated in the accompanying drawings, in which—

Figure I is a vertical central section through the improved coffee-urn. Fig. II is a fragmentary elevation of the supply-tank. Fig. III is a plan of the smaller strainer removed. Fig. IV is a top plan of the upper strainer removed. Fig. V is a top plan of the intermediate strainer removed.

The letter $a$ indicates the water-holder, inside of which hangs a coffee-holder (marked $b$) on a flange, (marked $l$,) which is circular and fits loosely on the water-holder, leaving a space between the sides of the water-holder and the coffee-holder. This space (marked $m$) is utilized for the passage of steam, which keeps the coffee uniformly heated. The cover (marked $k$) fits on the coffee-holder, and in shape is a circular arc.

On the inside of the coffee-holder hangs a vessel (marked $c$) containing an upper strainer (marked $i$) and a lower strainer, (marked $e$,) between which two hangs a sack or cloth, (marked $n$,) which is secured to the strainer, (marked $i$,) into which the ground berry is placed. Within the bottom of $c$ is a small strainer, (marked $f$.)

The letter $d$ indicates a space in which is deposited the settlings of the coffee passing through the strainer $e$.

The letter $h$ indicates a piece of fine flannel, which is attached to the small strainer $f$ by a ring, (marked $g$.)

$n$ represents a section of the water-tank, from which the water is supplied to the water-holder $a$ by means of a block-tin pipe (marked $t$) connecting with the water-holder, and attached to which last named is a water-gage, (marked $s$.)

To the side of the water-holder is attached a cock (marked $q$) for the purpose of drawing the heated water, which is used to pour through strainer $i$ over the coffee contained in sack or cloth $n$.

Attached to the coffee-holder (marked $b$) on the bottom of the same is a conduit or pipe, (marked $o$,) made of block-tin, extending to the side of the water-holder, to which is affixed a cock (marked $p$) for the purpose of drawing off the coffee as needed.

Near the bottom of the water-holder is another cock, (marked $r$,) by which the settlings of the water are drawn off and the water-holder is emptied.

The letter $u$ indicates a stand on which the combined water-holder and coffee-holder may be placed, and the letter $v$ indicates the gas-burner.

Having fully described my invention, what I claim, and desire to secure by Letters Patent, is—

1. The combination, with the source of heat and the water-holder above the same, of the coffee-holder suspended within the water-holder and having discharge-pipe from its bottom passing through the water-holder, and the vessel C within the coffee-holder and provided with a sack, and a strainer $e$ below said sack, substantially as described.

2. The combination, with the source of heat and the water-holder above the same, of the coffee-holder suspended within the water-holder and having discharge-pipe from its bottom passing through the water-holder, and the vessel C within the coffee-holder and provided with a sack and a strainer $e$ below said sack, and a smaller strainer $f$ below the strainer $e$, with settling-chamber $d$ between the same, substantially as described.

3. The combination, with the water-holder and the coffee-holder suspended within the same, leaving a space between it and the latter, of the vessel C, suspended within the coffee-holder, the apertured lid to said vessel, the sack carried by said lid, the strainer $e$ beneath said sack, and the smaller strainer $f$ beneath the strainer $e$, with a settling-chamber $d$ between the two, substantially as described.

HENRY BRUNHAUS.

Witnesses:
CHAS. V. SCOTT,
H. C. CALDWELL.